United States Patent Office 3,368,538
Patented Feb. 13, 1968

3,368,538
FUEL PUMP FOR MOTOR VEHICLES
Heinz Pauli and Günter Frohberg, Neuss (Rhine), Germany, assignors to A. Pierburg Auto- und Luftfahrt-Gerätebau K.G., Neuss (Rhine), Germany
Filed Nov. 2, 1965, Ser. No. 506,092
Claims priority, application Germany, Nov. 6, 1964, P 35,457
3 Claims. (Cl. 123—136)

ABSTRACT OF THE DISCLOSURE

The combination of a fuel pump for a motor vehicle, the pump including a fuel outlet and a fuel inlet, each having a spring-biased valve located therein, a spring-loaded shut-off valve connected to the outlet, the shut-off valve including a closure member, means defining a valve chamber on one side of the diaphragm, means defining a fuel chamber on the other side of the diaphragm, a spring acting on the closure member to hold the member in a closed position, means defining a first passage interconnecting the outlet with the valve chamber, and means defining a second passage interconnecting the inlet with the fuel chamber. Thereby the pressure of the fuel delivered by the pumps acts on the one side of the diaphragm to move the closure member from the closed position to an open position against the action of the spring, and negative pressure in the inlet acts on the other side of the diaphragm to assist the movement of the closure member against the spring.

---

In motor vehicles having engines with carburettors in which, for reasons of design or owing to the vehicle being parked in an inclined position, the fuel tank is higher than the carburettor, fuel losses frequently occur when the vehicle is at rest due to the fact that fuel flows to the carburettor from the tank through the valves of the fuel pump, which do not by themselves always close absolutely tightly, and causes the carburettor to overflow.

Unfortunately, it is not possible to equip fuel pumps with valves which close absolutely tightly when the pump is at rest, because the small stroke and the rapid stroke sequence of the fuel pumps which are usually employed in motor vehicles permit the use of only very easily movable and correspondingly light valve closure members which are only loaded by weak springs. In no case are the weak springs of the valves, which both open towards the carburettor, able to withstand the pressure of a column of fuel bearing on the closure members.

These fuels losses cannot either be prevented by, for instance, providing a securely closing unidirectionally acting shut-off valve in the path of flow from the tank to the carburettor, because on operation of the engine of the vehicle the blocking action of such a valve would have to be overcome by the pressure of the fuel to be delivered to the carburettor and the pressure required for this purpose cannot readily be produced by conventional fuel pumps. Moreover, the inlet valve of the carburettor, which should prevent the fuel chamber of the carburettor from overflowing, would then also have to be under a closing pressure which the floats of conventional carburettors likewise cannot provide.

With the aim of overcoming this drawback, according to this invention, a fuel pump for a motor vehicle has connected to its outlet a spring-loaded shut-off valve having a closure member which opens under the pressure of the fuel delivered by the pump acting on one side of a diaphragm against the action of the spring, the pump suction being in communication with the other side of the diaphragm so that when the pump is not in operation and there is a positive pressure in the pump suction this assists the spring to hold the closure member in its closed position, but when the pump is in operation and the pressure in the pump suction is reduced the force tending to hold the closure member in its closed position is reduced.

Since when the vehicle is in service the closing force of the valve spring is reduced by the negative pressure of the fuel acting on the diaphragm and the opening of the valve by the pressure of the fuel delivered by the pump acting on the other side of the diaphragm is thereby facilitated, the valve spring may be so rated that it presses the closure member absolutely tightly against its seat when the pump is stopped. A particularly powerful spring is not required for this purpose, however, because when the pump is at rest the column of fuel acts uniformly on both sides of the valve diaphragm. The valve therefore opens easily under the delivery pressure of the pump.

An example of a fuel pump constructed in accordance with the invention and of a vehicle incorporating this pump are shown diagrammatically in the accompanying drawings in which.

Figure 1:
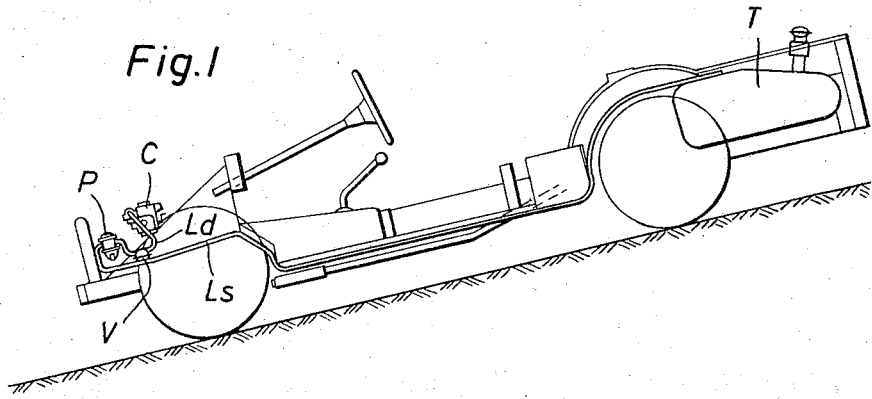
FIGURE 1 is a side view of the chassis of the motor vehicle parked on a slope.

As shown in FIGURE 1, a suction pipe $L_s$ leads from a fuel tank T arranged at the rear of the vehicle to a fuel pump P, which delivers the fuel to a carburettor C through a pipe $L_d$. Disposed in the pipe $L_d$ is a shut-off valve V having a fuel chamber connected to the suction pipe $L_s$. Since, owing to the inclined position of the vehicle, the tank T is in a considerably higher position than the carburettor C, fuel could reach the carburettor C by way of not tightly closing valves of the pump P if the valve V were not present and could cause the carburettor to overflow. When the pump is at rest, however, the valve V blocks the path of the fuel from the pump P to the carburettor C.

Figure 2:
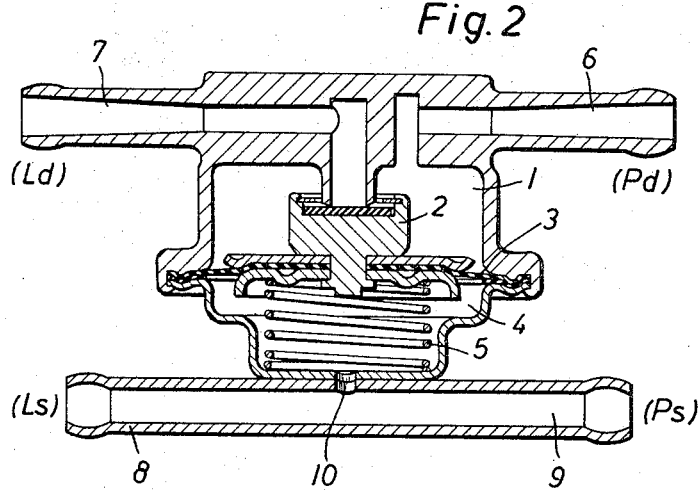
FIGURE 2 is a longitudinal section of the shut-off valve.

The construction of the shut-off valve V is shown in FIGURE 2. A valve chamber 1 contains a closure member 2. The bottom of the chamber 1 is closed by a diaphragm 3 to which the closure member 2 is attached and which separates the valve chamber 1 from a fuel chamber 4. The chamber 4 contains a spring 5 loading the closure member 2 by way of the diaphragm 3. The valve housing is provided with a total of four flexible-pipe unions, a union 6 communicating with the valve chamber 1 and being connected to a pressure pipe $P_d$ leading from the fuel pump P. A union 7 is connected to the pipe $L_d$ leading to the carburettor C. Unions 8 and 9 form the ends of a through tube which is fixed to the valve housing and is in communication with the fuel chamber 4 through a bore 10. The suction pipe $L_s$ leading from the tank T is connected to the union 8, while the union 9 is connected to the pump suction pipe $P_s$.

Figure 3:
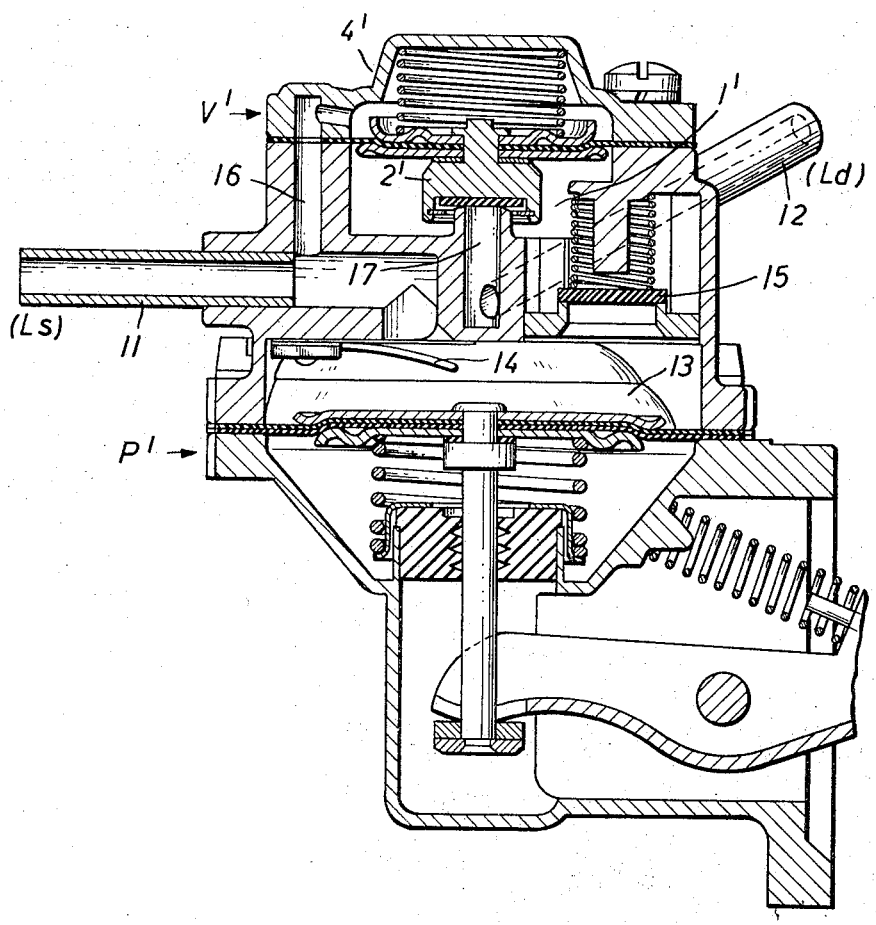
FIGURE 3 is a longitudinal section of the fuel pump with the shut-off valve combined with it in the same housing.

In the assembly illustrated in FIGURE 3, a conventional mechanically operated fuel pump P', which in this case is in the form of a diaphragm pump, and a shut-off valve V' are combined in a housing. The housing has only two flexible-pipe unions, a union 11 being intended for connection to the suction pipe $L_s$ and a union 12 for connection to the feed pipe $L_d$. A fuel chamber 13 of the pump P' is provided with an inlet valve 14 and an outlet valve 15. The outlet valve 15 opens directly into a valve chamber 1' of the valve V', a fuel chamber 4' of which is in communication with the suction bore of the pump P' through a duct 16 extending through the housing. An outlet bore 17 of the valve V' is in direct communication with the outlet union 12.

When the pump P or P' is out of operation and the vehicle is on an incline as shown in FIGURE 1, there is a positive pressure in the pipe $L_s$ and this acts through the bore 10 on the diaphragm 3 to assist the spring 5 to hold the closure member 2 in the closed position. When the pump P or P' is operating however the pressure in the pipe $L_s$ is reduced so that the total force acting to hold the closure member 2 closed is also reduced and the closure member 2 is then readily opened by the delivery pressure of the pump acting on the side of the diaphragm 3 remote from the spring 5.

The shut-off valve V or V' can also be used with equal success in vehicles having a multi-carburettor engine. In this case, the valve outlet 7 or 12 is branched accordingly.

We claim:

1. In combination, a fuel pump for a motor vehicle, said pump including a fuel outlet and a fuel inlet, each having a spring-biased valve located therein, a spring-loaded shut-off valve connected to said outlet, said shut-off valve including a closure member, a diaphragm connected to said closure member, means defining a valve chamber on one side of said diaphragm, means defining a fuel chamber on the other side of said diaphragm, a spring acting on said closure member to hold said member in a closed position, means defining a first passage communicating said outlet with said valve chamber and means defining a second passage communicating said inlet with said fuel chamber, whereby the pressure of fuel delivered by said pump acts on said one side of said diaphragm to move said closure member from said closed position to an open position against the action of said spring, and negative pressure in said inlet acts on said other side of said diaphragm to assist the movement of said closure member against said spring.

2. In combination, a fuel pump for a motor vehicle, said pump including a fuel outlet and a fuel inlet, and a spring-loaded shut-off valve connected to said outlet, said valve including a closure member, a diaphragm connected to said closure member, means defining a valve chamber on one side of said diaphragm, means defining a fuel chamber on the other side of said diaphragm, a spring acting on said closure member to hold said member in a closed position, means defining a first passage communicating said outlet with said valve chamber and means defining a second passage communicating said inlet with said fuel chamber, whereby the pressure of fuel delivered by said pump acts on said one side of said diaphragm to move said closure member from said closed position to an open position against the action of said spring, and negative pressure in said inlet acts on said other side of said diaphragm to assist the movement of said closure member against said spring, and a housing enclosing said pump and said valve and said housing including parts forming said means defining said first and said second passage.

3. In a motor vehicle including an engine, said engine including a carburettor, a fuel tank, a fuel pump, said pump including an outlet and an inlet, means connecting said inlet to said tank and means connecting said outlet to said curburettor, the improvement comprising a spring-loaded shut-off valve interposed between said outlet and said carburettor, said valve including a closure member, a diaphragm connected to said closure member, means defining a valve chamber on one side of said diaphragm, means defining a fuel chamber on the other side of said diaphragm, a spring acting on said closure member to hold said member in a closed position, means defining a first passage communicating said outlet with said valve chamber and means defining a second passage communicating said inlet with said fuel chamber, whereby the pressure of fuel delivered by said pump acts on said one side of said diaphragm to move said closure member from said closed position to an open position against the action of said spring, and negative pressure in said inlet acts on said other side of said diaphragm to assist the movement of said closure member against said spring.

References Cited

UNITED STATES PATENTS

| 2,212,486 | 8/1940 | Zoder | 123—136 |
| 2,588,530 | 3/1952 | Ifield | 60—39.28 X |
| 2,706,520 | 4/1955 | Chandler | 137—98 X |
| 2,876,758 | 3/1959 | Armstrong | 123—119 X |
| 3,086,580 | 4/1963 | Capehart | 123—136 X |

LAURENCE M. GOODRIDGE, *Primary Examiner.*